US012737938B2

(12) United States Patent
Fielding et al.

(10) Patent No.: US 12,737,938 B2
(45) Date of Patent: Sep. 15, 2026

(54) GRAPHICS TEXTURE PROCESSING

(71) Applicant: Arm Limited, Cambridge (GB)

(72) Inventors: Edvard Fielding, Trondheim (NO); Rodolfo Luis Jalabert Castellanos, Trondheim (NO); Jorn Nystad, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/477,647

(22) Filed: Sep. 29, 2023

(65) Prior Publication Data

US 2025/0111555 A1 Apr. 3, 2025

(51) Int. Cl.

*G06T 11/10* (2026.01)
*G06T 1/20* (2006.01)
*G06T 1/60* (2006.01)

(52) U.S. Cl.

CPC ................ *G06T 11/10* (2026.01); *G06T 1/20* (2013.01); *G06T 1/60* (2013.01); *G06T 2210/52* (2013.01)

(58) Field of Classification Search

CPC . G06T 11/001; G06T 1/20; G06T 1/60; G06T 2210/52

See application file for complete search history.

(56) References Cited

U.S. PATENT DOCUMENTS 7,167,183 B1 * 1/2007 Donovan .................. G06T 1/60 345/582
8,687,010 B1 * 4/2014 Battle ...................... G09G 5/36 345/582
2004/0085325 A1 * 5/2004 Wang .................... G06T 11/001 345/582
2015/0121052 A1 * 4/2015 Emma ....................... G06F 9/44 713/1
2020/0143580 A1 * 5/2020 Seiler .................... G06T 11/203
2021/0398241 A1 * 12/2021 Fetterman ................. G06T 1/60

* cited by examiner

*Primary Examiner* — Haixia Du

(74) *Attorney, Agent, or Firm* — Pearl Cohen LLP

(57) ABSTRACT

When performing texture processing operations in a graphics processing system, for a texture processing operation that requires M input texture data elements from an array of texture data elements, each of the M texture data elements is selected from a different set of texture data elements having a different set of positions within the texture data array. The texture processing operation is then performed using the M texture data elements.

20 Claims, 9 Drawing Sheets

901

| | | | |
|---|---|---|---|
| 18 0x2397 | 1a 0x7E7B | 30 0x3C38 | 32 0x1FFB |
| 1c 0x8AA6 | 1e 0x913A | 34 0x6087 | 36 0x0C13 |
| 48 0xBF9B | 4a 0xCA79 | 60 0x4A7F | 62 0x7F11 |
| 4c 0x9565 | 4e 0x7CA3 | 64 0x2D9C | 66 0x19B2 |

FIG. 9

GRAPHICS TEXTURE PROCESSING

BACKGROUND

The technology described herein relates to a method of and an apparatus for texture data processing in a graphics processing system, and in particular to a method of and an apparatus for providing (picking) texture data elements for performing texture processing operations.

It is common in graphics processing systems to generate data values (e.g. colours) for sampling positions in a render output (e.g. image to be displayed) by applying so-called textures or texture data to the surfaces to be drawn. Such textures are typically applied by storing an array of texture elements or "texels", each representing given texture data (such as colour, luminance and/or light/shadow, etc., values), and then mapping the texels onto the corresponding elements, such as (and typically), a set of sampling positions, for the render output in question (e.g. image to be displayed).

Thus a graphics texture will typically be configured as an array of data elements (texture elements (texels)), each having a corresponding set of texture data stored for it. The texture data for a given position within the texture is then determined by sampling the texture at that position (e.g. by using a bilinear interpolation process).

When texture data is needed by a graphics processor (e.g. for rendering an image to be displayed), the texture data required for the rendering process is usually first fetched from the memory where it is stored and loaded into a cache (e.g. a texture cache) of or accessible to the graphics processor, with the graphics processor (the rendering pipeline implemented by the graphics processor) then reading the texture data from the cache for use to perform texture-related operations. For example, a 2×2 "quad" of texture data elements may be read in order to perform a bilinear filtering operation.

FIG. 1 shows an exemplary graphics texture array 100 comprising texture data elements 101, that has been fetched from memory and stored in a texture data cache. The texture array is in the form of an 4×8 grid of texture data elements, i.e. comprising 32 texture data elements.

FIG. 2 shows schematically a process for providing four texture data elements from the texture data array 100 of FIG. 1 that are required to perform a bilinear filtering operation. Only sixteen of the thirty-two texture data elements 101 making up the texture array 100 are shown (in a one-dimensional line), for the purposes of clarity.

Each of the texture data elements 101 of the texture data array 100 is accessed via a respective read port 201 of the texture data cache, through which the texture data elements are selected (i.e. read). In order to allow any one of the texture data elements in the array to be provided as a respective input to the bilinear filtering operation, all the read ports are respectively connected via a respective 32-to-1 MUX tree to each respective bilinear filtering input. In this way, any texture data element 101 of the texture data array 100 can be selected by any of the 32-to-1 MUX trees. The four texture data elements 211, 212, 213 and 214 needed for a bilinear filtering operation to be performed are selected out of each and every one of the texture data elements through their respective read ports (as illustrated by the arrows in the diagram, from each and every texture data element of the cache to) using four respective 32-to-1 multiplexer trees (MUX) 250 (i.e. one for each texture data element to be selected).

The Applicants believe that there is scope for improvement to the process of providing texture data from a texture data array for use as inputs to a texture processing operation.

BRIEF DESCRIPTION OF THE DRAWINGS

Various embodiments will now be described by way of example only and with reference to the following figures, in which:

FIG. 9 shows colour values of texture data elements according to an embodiment of the technology described herein.

DETAILED DESCRIPTION

Figure 1:
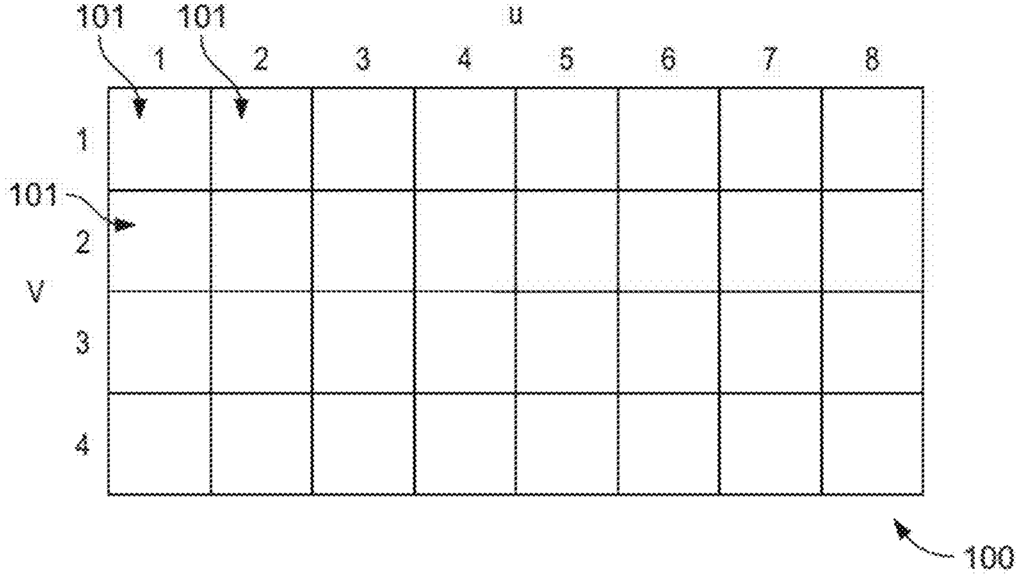
FIG. 1 shows an exemplary graphics texture data array comprising texture data elements.
Figure 2:
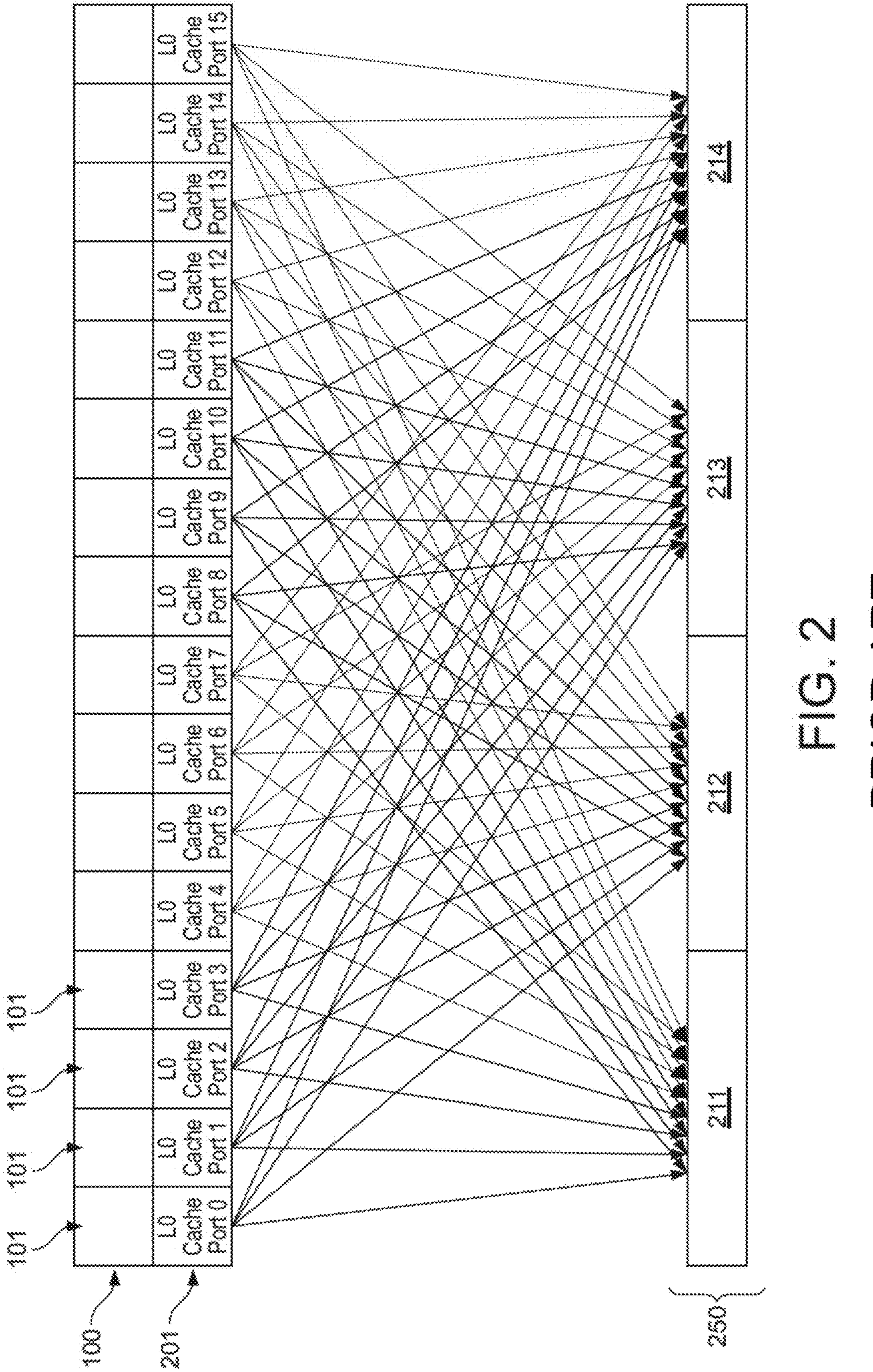
FIG. 2 shows schematically a process for providing four texture data elements from the texture data array of FIG. 1.

A first embodiment of the technology described herein comprises a method of operating a graphics processing system in which texture data elements are used for performing texture processing operations, the texture data elements being arranged in an array of texture data elements, each texture data element of the texture data array having a respective position within the texture data array, the method comprising:

- providing M texture data elements as inputs for a texture processing operation from a texture data array, each of the M texture data elements being selected from a different set of texture data elements having a different set of positions within the texture data array; and
- performing the texture processing operation using the M texture data elements.

Another embodiment of the technology described herein comprises a graphics processor operable to perform texture filtering operations using texture data elements from array of texture data elements, each texture data element of the texture data array having a respective position in the texture data array, the graphics processor comprising:

- a texture data element providing circuit operable to provide M texture data elements for a texture processing operation from a texture data array, each of the M texture data elements being selected from a different set of texture data elements having a different set of positions within the texture data array; and a texture processing circuit operable to perform a texture processing operation using the M texture data elements.

The technology described herein relates to the providing of texture data elements (values) for use when performing texture processing (filtering) operations.

As discussed above, a texture processing operation, such as a bilinear filtering operation, will require a plurality, e.g. 4, texture data elements (texels) as its inputs.

In the technology described herein, when providing the texture data elements as inputs for the texture operation, rather than selecting each input texture data element from all of the texture data elements in the texture data array, each input texture data element is instead selected only from a particular subset of the texture data elements in the texture data array, and in particular from a subset of the texture data elements that have a particular set of positions within the array. Thus, a first input texture data element will be selected from (only) the texture data elements having a first set of positions within the texture data array, and a second input texture data element will be selected from (only) the texture data elements having a second (different) set of positions within the texture data array (and so on).

Thus, in the technology described herein, whenever an input texture data element is provided, it is selected from only a subset of the total number of texture data elements in the texture data array (rather than from, e.g., all of the texture data elements in the array). Selecting each of the input texture data elements from a reduced set of texture data elements (of texture data element positions) can advantageously reduce the amount of wiring, and hence the area and energy consumption, of the circuit required in order to provide the input texture data elements, compared to, e.g., the case wherein each of the texture data elements for a texture operation can be selected from all of the texture data elements in the texture array.

The Applicants have recognised in this regard that the texture-related operations performed by graphics processors typically require texture data elements that are in a predictable (e.g. predefined) positional pattern (configuration), and that this can be exploited when providing the individual input texture data elements. For example, in the case of a bilinear filtering, four input texture data elements are generally configured in the form of a 2×2 "quad" of texture data elements.

As will be discussed further below, the applicants have recognised that the predictability in the positional patterns of texture data elements needed for texture-related operations means that it is possible to cover any possible configuration of texture data elements that could be required for a texture processing operation using an arrangement in which the input texture data elements are selected from only a subset of texture data elements (of texture data element positions) in the texture data array.

The applicants have further recognised that the benefits in reducing the size of the circuit required to provide the input texture data elements are further enhanced in systems wherein multiple sets of input texture data elements required for carrying out different texture data operations in parallel, e.g. for different processing threads.

The number of texture data elements M that are provided for the texturing operation in the manner of the technology described herein may be any suitable integer of 2 or above.

In an embodiment, M is equal to four. Thus in this embodiment, the method comprises (and the graphics processor is correspondingly operable to):

providing a first input texture data element for a texture processing operation (only) from texture data elements having a first set of positions within the texture data array;

providing a second input texture data element for the texture processing operation (only) from texture data elements having a second, different set of positions within the texture data array;

providing a third input texture data element for the texture processing operation (only) from texture data elements having a third, different set of positions within the texture data array;

providing a fourth input texture data element for the texture processing operation (only) from texture data elements having a fourth, different set of positions within the texture data array; and performing the texture processing operation using the four texture data elements.

The texture operation that is performed using the selected texture data elements could be any suitable or desired texture-related operation (for example, a filtering operation). In embodiments wherein M is equal to four, the texture operation that is performed in an embodiment comprises a bilinear filtering operation.

The texture data array (from which the texture data elements to be used in the texture operation are provided) may comprise any suitable array of texture data elements. In an embodiment, the texture data array is in the form of a rectangular (including square) grid of texture data elements, e.g. a grid of 4×4, or 8×8 texture data elements, etc. The texture data array could be the contents of the texture cache, although this need not necessarily be the case (as will be discussed further below).

In the technology described herein, M input texture data elements are selected from texture data elements having different sets of positions in the texture data array, with a first data element being selected from data elements having a first set of positions in the texture data array, a second data element being selected from texture data elements having a second set of positions in the texture data array, and so on.

The texture data array will, correspondingly, be made up of texture data elements, each of which can be thought of as having (i.e. being mapped to) one of M different sets of positions. Thus the texture data array will be made up of data elements mapped to (i.e. having) a first set of positions in the texture data array, texture data elements mapped to (i.e. having) a second set of positions in the texture data array, etc. and so on.

The texture data elements in the texture data array can be mapped to the respective M sets of positions in any suitable or desired manner.

In an embodiment, the mapping of texture data elements of the texture data array to the (M) different sets of positions is such that any particular combination of texture data elements that could be required for a typical texture processing operation that is to be performed can be made up of one texture data element from each of the different sets of positions (at most). For example, in the case wherein M=4 and the 2×2 "quad" of texture data elements are to be provided for use in bilinear filtering operations, the mapping is in an embodiment such that any desired "quad" of texture data elements that could be required for a bilinear filtering operation can be made up of, e.g., a texture data element from the first set of positions, a texture data element from the second set of positions, a texture data element from the third set of positions, and a texture data element from the fourth set of positions.

In an embodiment, the texture data elements are mapped to the respective sets of positions in a particular, in an embodiment selected, in an embodiment predefined, in an embodiment regular, pattern. This is in an embodiment achieved by the texture data array comprising (and, in some embodiments, consisting of) a (in an embodiment regular) arrangement of groups of M texture data elements, in an embodiment with each group of M texture data elements containing one texture data element from each respective one of the M sets of positions.

Thus, for example, in embodiments wherein M=4, the texture data array in an embodiment comprises (and, in some embodiments, consists of) a (in an embodiment regular) arrangement of groups, wherein each of the groups comprises four texture data elements: a texture data element mapped to the first set of positions ("position A"), a texture data element mapped to the second set of positions ("position B"), a texture data element mapped to the third set of positions ("position C"), and a texture data element mapped to the fourth set of positions ("position D").

In embodiments wherein M=4, each of these groups comprises a 2×2 "quad" (i.e. grid) of texture data elements, e.g. with each of the groups having the texture data element in the top left of the quad being mapped to the first set of positions ("position A"), the texture data element in the top right of the quad being mapped to the second set of positions ("position B"), the texture data element in the bottom left of the quad being mapped to the third set of positions ("position C") and the texture data element in the bottom left of the quad being mapped to the fourth set of positions ("position D").

In one such embodiment, the texture data array comprises a plurality of these "quad" groups arranged adjacent to one another in a grid, i.e. with each row of the texture data array comprising texture elements from the top half of different quads only, or texture data elements from the bottom half of different quads only. For example, the top (i.e. first) row of the texture array could be made up of the top two data elements of a plurality of adjacent "quad" groups, with the next (i.e. second) row of the texture array being made up of the bottom two data elements in each of those adjacent "quad" groups, and the next (i.e. third) row of the texture data array being made up of the top two data elements of a different plurality of adjacent "quad" groups, and so on. In the case wherein the texture data elements in each of the positions in each quad are mapped to "A", "B", "C" and "D" positions (respectively) in the manner discussed above, this means that, reading left to right, the texture data elements in the top (i.e. first) row of the texture data array will have positions of "ABABABAB . . . " etc, the texture data elements in next (i.e. second) row of the texture data array will have positions of "CDCDCDCD . . . " etc, the texture data elements in next (i.e. third) row of the texture data array will have positions of "ABABABAB . . . ", and so on.

In another such embodiment, the texture data array comprises a plurality of these "quad" groups arranged in a staggered/offset arrangement with one another, i.e. such that rows of the texture data array are made up the top two data elements of quad groups alternated with the bottom two data elements of other quad groups. For example, a row of the texture array could be made up of (when looking from left to right) the top two texture data elements of a first "quad" group, followed by the bottom two texture data elements of a second "quad" group, followed by the top two texture data elements of a third "quad" group, etc. and so on. In the case wherein the texture data elements in each of the positions in each quad are mapped to "A", "B", "C" and "D" positions (respectively) in the manner discussed above, this means that, reading left to right, the texture data elements in a (e.g. first) row of the texture data array will have positions of "ABCDABCD . . . " etc, the texture data elements in next (i.e. second) row of the texture data array will have positions of "CDABCD . . . " etc, the texture data elements in next (i.e. third) row of the texture data array will have positions of "ABCDABCD . . . ", and so on.

Staggering the groups of texture data elements in this manner can be advantageous, as it can reduce the likelihood of producing MUX conflicts (wherein a same MUX tree is required to select two texture data elements mapped to a same set of positions) when performing (rare) wrapping operations.

As will be understood, each of these mappings are such that they ensure that any four (i.e. "quad" of) texture data elements (of the texture data array) that could be required for a typical bilinear filtering operation will comprise one texture data element from each of the four sets of positions (i.e. a texture data element from each of the sets of "A", "B", "C" and "D" positions). In other words, the mapping guarantees that any desired "quad" of texture data elements (in the texture data array) can be provided by providing a first texture data element selected from texture data elements having the first set of positions ("position A"), a second texture data element from texture data elements having the second set of positions ("position B"), a third texture data element from texture data elements having the third set of positions ("position C) and a fourth texture data element from texture data elements having the fourth set of positions ("position D").

For example, the four texture data elements required for a bilinear filtering operation could made up of the texture data elements in the "A", "B", "C" and "D" positions in a single group; or they could be made up of texture data elements in the "A" and "B" positions in a first group and the texture data elements in the "C" and "D" positions in another (adjacent) group; or they could made up of texture data elements in the "A" and "C" positions in a first group and texture data elements in the "B" and "D" positions in another (adjacent) group; or they could be made up of a texture data elements occupying across the four different "A", "B", "C" and "D" positions across four different groups, etc.

In an embodiment, the texture data elements having the respective sets of positions in the texture data array are stored in respective entries in the cache that are designated for those texture data elements having the respective sets of positions. In other words, the cache in an embodiment comprises a first set of entries that are designated for storing (only) texture data elements having the (first) set of "A" positions in the texture data array, a second set of entries that are designated for storing (only) texture data elements having the (second) set of "B" positions in the texture data array, and so on.

A (e.g. each) line of the cache could (and in embodiments, does) comprise multiple entries which are designated to respective sets of positions, optionally spread across one or more cache banks. For example, in an embodiment, a cache line comprises eight 128-bit wide cache banks, each of the eight 128-bit wide cache banks comprising two 64-bit wide cache entries which are designated to respective sets of positions (thus a cache line can be thought of as comprising sixteen separate 64-bit wide cache entries designated to respective sets of positions).

In embodiments wherein a cache line comprises multiple entries designated to respective sets of positions, it is in an embodiment the case that the number of entries in a particular cache line is a multiple of M, such that each cache line comprises an equal number (K) of entries designated to each of the M sets of positions (i.e., K entries designated to position "A", K entries designated to position "B", and so on), wherein K is in an embodiment a power of 2. For example, in the embodiment discussed above, M=4 and K=4, i.e. such that a given cache line (of sixteen cache entries) comprises four entries designated to position "A", four entries designated to position "B", four entries designated to positions "C" and four entries designated to position "D".

The entries in the cache line are in an embodiment designated to respective sets of positions in a in an embodiment regular, in an embodiment predetermined way, e.g. based on the position of the entry in the cache line. For example, in the embodiment discussed above, the first, fifth, ninth and thirteenth entries in a cache line are designated to position A, whereas the second, sixth, tenth and fourteenth entries in a cache line are designated to position B, and so on.

In embodiments wherein texture data elements having the respective sets of positions in the texture array are stored in respective entries in the cache, it is in an embodiment the case that, when writing texture data elements to the cache, texture data elements are (only) written to the cache entries designated for the position (subset) of the texture data element in question. This can be carried out in any suitable or desired manner.

For example, and in an embodiment, each cache entry could be mapped to a respective set of positions or position offsets (and/or a corresponding set of memory addresses/address offsets for the positions/position offsets) in the texture, with the texels then being stored in the cache entries based on their positions and/or position offsets (and/or addresses or address offsets) in the texture, using and based on the mapping.

Additionally or alternatively, each of the cache entries could be assigned with an identifier representative of the set of positions (e.g. "A", "B", "C" or "D") to which the cache entry is designated, with this identifier then being checked against a corresponding identifier for a particular texture data element that is to be written to the cache, such that only a texture data element having an identifier that matches an entry in the cache can be stored in that entry in the cache. This would ensure, for example, that a texture data element having an "A" position would only be stored in a cache entry that is designated for storing texture data elements having the "A" position, whereas a texture data element having a "B" position would only be stored in a cache entry that is designated for storing texture data elements having the "B" position, and so on.

Other arrangements would, of course, be possible.

In some embodiments, each cache entry has a bit width that is at least as wide as the texture data elements, such that a single cache entry is sufficient to store an (entire) texture data element. In an embodiment, the bit width of the cache entry matches the bit width of a texture data element (e.g. with each texture data element having a bit width of 64 bits, and each cache entry having a corresponding bit width of 64 bits).

However, this need not necessarily be the case. In another embodiment, each cache entry has width which is smaller that a texture data element, such that a texture data element is stored across multiple (e.g. 2) different cache entries.

In other embodiments (discussed further below), the bit width of the cache entry is sufficient for the cache entry to store multiple (e.g. four) texture data elements (e.g. with each texture data element having a bit width of 16 bits, and each cache entry having a bit width of 64 bits, such that four texture data elements can be stored in each cache entry).

In the technology described herein, and as discussed above, a first input texture data element is provided from texture data elements having a first set of positions in the texture data array (i.e. "position A"), a second input texture data element is provided from texture data elements having a second set of positions in the texture data array (i.e. "position B"), and so on. The process of providing a texture data element from the texture data elements having the corresponding set of positions in the texture data array can be carried out in any suitable or desired manner, e.g. by any suitable or desired circuit(s).

In an embodiment of the technology described herein, each of the M selections are carried out by a respective multiplexer tree, with the multiplexer tree taking as its inputs respective texture data elements having the respective set of positions in the texture data array. Thus, for example, the first texture data element is in an embodiment provided by a first multiplexer tree that takes as its inputs the texture data elements having the first set of positions (i.e. the "A" positions) in the texture data array, and the second texture data element is provided by a second multiplexer tree that takes as its inputs the texture data elements having the second set of positions (i.e. the "B" positions) in the texture data array, etc. and so on.

The multiplexer trees can be configured as desired. In an embodiment of the technology described herein, the multiplexer trees are made up of a plurality of 2:1 multiplexers, although this need not necessarily be the case.

In an embodiment, (e.g. each of) the multiplexer trees take as their respective inputs only the texture data elements having the respective set of positions in the texture data array (and not any texture data elements having another set of positions in the texture data array). For example, the first multiplexer tree in an embodiment takes as its inputs only the texture data elements having the (first) set of "A" positions in the texture data array and is not any texture data elements having the (second) "B", (third) "C" or (fourth) "D" positions. Similarly, the second multiplexer tree in an embodiment takes as its inputs only the texture data elements having the (second) set of "B" positions in the texture data array, and not any texture data elements having the (first) "A", (third) "C" or (fourth) "D" positions, and so on.

This can be achieved as desired.

In the case where texture data elements are stored in a cache for use, and, in particular, texture data elements having a particular set of positions are stored in a corresponding set of entries in the cache, each multiplexer tree is in an embodiment connected to only the cache entries that store texture data elements having the respective set of positions in the texture data array for the multiplexer tree in question (and not to cache entries that store texture data elements having another set of positions in the texture data array).

For example, a first multiplexer tree is in an embodiment connected to only the "A" cache entries (that are designated for storing texture data elements having the (first) set of "A" positions in the texture data array) and is not connected to "B", "C" or "D" cache entries (that are designated for storing texture data elements having the (second) set of "B" positions, (third) set of "C" positions, or (fourth) set of "D" positions in the texture data array, respectively).

Similarly, a second multiplexer tree is in an embodiment connected to only the "B" cache entries (that are designated for storing texture data elements having the (second) set of "B" positions in the texture data array) and is not connected to "A", "C" or "D" cache entries (that are designated for storing texture data elements having the (first) set of "A" positions, (third) set of "C" positions, or (fourth) set of "D" positions in the texture data array, respectively), and so on.

As will be understood, the multiplexer trees should have a bit width that is at least as wide (and in an embodiment matches) the bit width of the texture cache entries that store the texture data elements (and to which the multiplexer trees are connected), such that they can select all of the texture data element(s) stored in a cache entry. For example, if the cache entries have a width of 64 bits, then the multiplexer trees used to select the texture data elements should in an embodiment also have a bit width of at least 64 bits.

In embodiments wherein one or more texture elements are stored in each cache entry, this means that the multiplexer trees will have a bit width that is sufficient for selecting all of the one or more texture data elements stored in a cache entry (in a single processing cycle).

In embodiments (discussed above) wherein a single texture data element has a bit depth that is wider than each cache entry and is hence stored across multiple cache entries, and the multiplexer trees have a bit width that corresponds to a cache entry, this means that each multiplexer tree will only be able to select a portion of a given texture data element. In these embodiments, a (in an embodiment different) multiplexer tree is used to select each respective portion of a given texture data element, with those portions then (in an embodiment) being combined in order to provide the (entire) texture data element.

For example, in an embodiment, wherein texture data elements have a bit depth of 64 bits and are stored in cache entries of 32 bits, in order for a single texture data element to be selected (in its entirety) each half of the texture data element will need to be selected by a (in an embodiment different) multiplexer tree, and then combined in order to provide the full 64 bit texture data element.

It should be noted that spreading a single texture element across multiple texture cache entries/multiplexer trees in this manner can be advantageous in situations where wrapping operations might otherwise produce MUX conflicts compared to arrangements where fewer cache entries/multiplexer trees are used to store/select a given texture data element.

The process of providing texture data elements and their subsequent use in performing a texture processing operation may be carried out multiple times in parallel, for example in respect of a plurality of T processing threads. Thus, in an embodiment, a set of M texture elements is provided and used to perform a first texture processing operation in accordance with the technology described herein for a first thread, with another set of M texture elements being provided and used to perform a second texture processing operation in accordance with the technology described herein for a second thread, etc. and so on.

Thus, in an embodiment of the technology described herein, the method comprises (and the graphics processor is operable to) providing M texture data elements as inputs for a texture processing operation for each of T threads in parallel (thereby providing M*T texture data elements), and performing T different texture processing operations (using the M*T texture data elements).

In these embodiments (wherein texture data elements are provided for texture processing operations to be performed in parallel across T different processing threads) each of the T threads in an embodiment has its own input texture data element provision circuit that is operable to provide the M texture data elements for the thread in question. For example, each of the threads may have its own set of M multiplexer trees (wherein each of the multiplexer trees is, as discussed above, operable to select a texture data element from a set of texture data elements having a respective set of positions in the texture data array).

As discussed above, in some embodiments texture data elements are stored in entries in the texture data cache. In an embodiment, the texture data elements stored in cache entries are connected to respective read ports in the texture data cache, from which the texture data elements can be selected in the manner discussed above (e.g. by multiplexer trees).

In an embodiment, texture data elements of different (and in an embodiment each of the) (M) sets of texture elements are connected to N read ports, i.e. such that the M texture elements for a texture processing operation to be performed are selected (provided) from M*N read ports. In embodiments wherein T different texture processing operations are to be performed (using M*T selected texture data elements), this means that M*T texture data elements are selected (provided) from M*N read ports in the texture data cache.

As discussed above, the technology described herein is in an embodiment capable of selecting any M texture data elements of the texture data array that could be required for the texture processing operation in question (e.g. by selecting a first texture data element belonging to the first set of positions (i.e. "position A"), a second texture data element belonging to the second set of positions (i.e. position B) and so on).

However, the applicants have recognised that, because each of the M texture data elements are being provided from only those texture data elements in the texture data array having the respective set of positions (and not from all of the texture data elements in the texture data array, as discussed above), this may result in the input texture data elements being provided "out of order" in relation to the order of the (input) texture data elements that is expected (required) for the texture data operation.

For example, in the case wherein M=4 and the texture operation is a bilinear filtering operation, the weights of the bilinear filtering operation may be provided in a specific order (e.g. the weights may comprise a first weight to be multiplied with the texture data element in the top left of the quad, a second weight to be multiplied with the texture data element in the top right of the quad, etc.). Thus the first weight provided, for example, is associated with the texture data element in the top left of the bilinear filtering quad. However, when the texture data elements are provided in the manner of the technology described herein, it could be that the first selected texture data element (that is selected from the texture data elements having a first set of positions ("position A") does not correspond to the top left position of the bilinear filtering quad.

The applicants have recognised that it can therefore be beneficial, in these situations, to reorder to the selected texture data elements such that they can be provided in an order that matches the (e.g. weights for the) texture data processing operation in question.

Thus in an embodiment of the technology described herein, the method comprises (and, correspondingly, the system is operable to) prior to performing the texture processing operation using the M texture data elements, reordering the M texture data elements.

The reordering of the selected data elements can be carried out in any suitable or desired manner.

In embodiments, the reordering step is carried out using a plurality of M-to-1 multiplexer trees, each M-to-1 multiplexer tree having as its input the M (selected) texture data elements and being used to select the appropriate one of the M data elements so that the input M texture data elements will be provided as inputs in their correct positions with respect of the texture data operation that is being performed. Thus in the case wherein M=4, the reordering step is carried out by four, 4-to-1 multiplexer trees, each receiving as an input the four selected data elements, and which can be used to select any of the four selected data elements in their correct position in respect of the bilinear filtering operation that is to be performed.

As discussed above, in some embodiments, the texture data operation being performed may comprise a texture data operation that uses contribution (interpolation) weights (that are to be multiplied by the selected texture data values), e.g. a bilinear filtering operation.

The Applicants have recognised that, rather than reorder the selected texture data elements to match the order of the weights (in the manner discussed above) it is instead possible to match the weights to the correct texture data elements by reordering the weights themselves. The Applicants have also recognised that this may have the added benefit of requiring smaller and/or less complex circuitry compared to reordering the texture data elements themselves, because the weights will typically have a smaller data size (bit depth).

Thus in another embodiment of the technology described herein, wherein the texture operation comprises multiplying selected texture data elements with weights, the method further comprises (and the system is correspondingly operable to) reordering the weights based on the order of the M selected texture data elements, prior to performing the texture operation.

The reordering of the weights can be carried out in any suitable or desired manner.

In an embodiment, the reordering of the weights is carried out using four 4-to-1 multiplexer trees, each multiplexer tree taking each of the weights as an input, which can be used to select any one of the weights in their correct position with respect to the ordering of the texture data elements that have been selected.

In some embodiments, the texture data array (from which texture data elements are provided in accordance with the technology described herein) comprises (e.g. the entirety of) the texture data array that is stored in the texture data cache. Thus, in these embodiments, when providing texture data elements for use in a texture operation, the texture data elements are directly providing from the array of texture elements stored in the texture data cache.

However, in other embodiments, the texture data array may comprise e.g. only a subset of the total number of texture data elements stored in the texture data cache.

The applicants have recognised in this regard that it will typically be the case that multiple different texture processing operations performed by multiple different processing threads will require texture data elements that are close to each other, such that they will (almost) always be within an array of texture data elements that is relatively small (compared to, e.g., the size of the array of texture data elements stored in the cache). For example, in the case of bilinear filtering operations, each of the 2×2 "quads" of texture data elements required for a plurality of processing threads will typically fall within a 4×4 grid (array) of texture data elements, whereas the texture cache may store a 8×8 array of texture data elements.

The applicants have recognised that, rather than provide texture data elements directly from the (large) array of texture data elements stored in the texture data cache, it can be beneficial to first select a (smaller) array of texture data elements from the (larger) array of texture data elements stored in the texture data cache, with the texture data elements required for the texture processing operation then being pulled out from the (smaller) array of texture data elements.

Selecting a smaller texture data array as a portion of the (larger) texture data array from which texture data elements are provided in this manner can further reduce the size of the circuit(s) required in order to carry out the texture data element provision process.

Thus in an embodiment of the technology described herein, the texture data array is part of a larger texture data array, and the method comprises (and the system is correspondingly operable to) prior to providing the M texture data elements from the texture data array, selecting the texture data array from the larger texture data array.

The selection of the texture data array from the larger texture data array can be carried out in any suitable or desired manner.

In an embodiment, the selection of the (smaller) texture data array is carried out using a set of multiplexer trees, each of the multiplexer trees being connected to each of the texture data elements in the larger texture data array. In an embodiment, there is one multiplexer tree for each of the texture data elements in the (smaller) texture data array, i.e. such that each of the multiplexer trees is used to select a respective texture data element of the (smaller) texture data array.

As discussed above, the texture elements of the texture data array will have (i.e. be mapped to) respective sets of positions.

It is in an embodiment the case that any (and all) of the texture data elements that are required for a typical texture processing operation to be performed can be provided by selecting single texture data elements from data elements having respective sets of positions in the texture data array in accordance with the technology described herein (e.g. by providing one texture data element from texture elements having a first set of positions (i.e. position "A") in the texture data array, one texture data element from texture elements having a second set of positions (i.e. position "B") in the texture data array, and so on).

However, the applicants have recognised that, although this will likely be the case for the vast majority of the texture processing operations to be performed, it may be that, in rare circumstances, a texture data operation to be performed could require more than one texture data element from texture data elements having a particular set of positions in the texture data array. For example, it could be the case that a (rare) texture data operation requires two texture data elements having (i.e. mapped to the set of "A" positions) in the texture data array. The applicants have recognised that this situation may occur when performing texture filtering operations with so-called "wrap mode" enabled, such that the texture in the texture data array is conceptually repeated horizontally and/or vertically, which means that texture data elements required for a texture operation could come from two opposite sides of the texture data array.

The applicants have recognised that the texture data elements required for these (rare) texture data operations can be provided by providing a texture data element from texture data elements having a set of positions within the texture data array (in the manner discussed above) in a first processing cycle, but then providing a second texture data element from those texture data elements having that (same) set of positions within the texture data array in another processing cycle.

Thus in some embodiments of the technology described herein, a texture data element is provided from texture data elements having a set of positions in a first processing cycle, and the method further comprises (and the system is correspondingly configured to):

prior to performing the texture processing operation, providing another texture data element from the texture data elements having the set of positions within the texture data array in a second processing cycle; and performing the texture processing operation using the two texture data elements provided in the first and second processing cycles from the texture data elements having the set of positions within the texture data array.

The process of providing input texture data elements (from texture data elements having a particular set of positions) across two different processing cycles can be carried out in a suitable or desired manner, and with any suitable or desired circuit(s).

As discussed above, in embodiments of the technology described herein, process of providing texture data elements is carried out by multiplexer trees. In embodiments of the technology described herein, when a (rare) texture data operation is to be performed using two data elements from a same set of positions in the texture data array (as discussed above), these two data elements are in an embodiment provided by the same multiplexer tree (over two separate processing cycles). Thus, for a multiplexer tree connected to texture data elements having a particular set of positions (e.g. position "A") in the texture data array, the multiplexer tree would be used to provide a first texture data element in a first processing cycle, and then the same multiplexer tree would be used to provide a second texture data element in a second processing cycle.

The texture data elements of the texture data array that are provided in accordance with the technology described herein may be of any suitable or desired form. The texture data elements may have any suitable or desired bit depth. In an embodiment, the texture data elements have a bit depth that is a power of 2 in size (e.g. a bit depth 8, 16, 32 or 64 bits), but this need not necessarily be the case. In an embodiment, the texture data elements have a bit depth of 64 bits.

In the discussion above, it has largely been assumed that the texture data elements are mapped to the positions in the texture data array (being considered in the technology described herein) (and that the MUX trees e.g. select from) in a 1:1 ratio, i.e. with a single texture data element having (i.e. mapped to) a single (such) position in the texture data array. It is in an embodiment the case that a (single) texture data element is stored in a (single) cache entry (that is designated to the set of positions to which the texture data element belongs).

However, this need not necessarily be the case, and in some embodiments of the technology described herein, a plurality of adjacent texture data elements have (i.e. are mapped to) to (e.g. each) (selectable) position(s) (e.g. in each set of positions) in the texture data array. In an embodiment, multiple texture data elements are stored in a single cache entry (that is designated to the set of positions to which the multiple texture data elements belong).

In one embodiment, for example, texture data elements are mapped to (selectable) positions in the texture data array in a 2:1 ratio, with two adjacent texture data elements having (i.e. mapped to) each single position in the array. Thus, in this case, each of the "A" positions in the texture data array will be occupied by two texture data elements (with both of those texture data elements having (i.e. mapped to) that particular A position in the texture data array), each of the "B" positions in the texture data array will be occupied by two (different) texture data elements, (with both of those texture data elements having (i.e. mapped to) that particular B position in the texture data array) etc. and so on.

Thus, in this embodiment, each two adjacent (e.g. 32 bit) texture elements having a single position in the array are stored in a single (e.g. 64 bit wide) entry in the cache (that is designated to that position). Thus for example, two adjacent texture data elements (having a particular "A" position in the texture array) will be stored in a (single) cache entry designated to the "A" position, and two (different) adjacent texture elements (having a particular "B" position in the texture data array) will be stored in another (single) cache entry designated to the "B" position, and so on.

In another embodiment of the technology described herein, the texture data elements are mapped to (selectable) positions in the texture data array in a 4:1 ratio, with four adjacent texture data elements having (i.e. mapped to) each single (selectable) position in the texture data array. Thus, in this case, each of the "A" positions in the texture data array will be occupied by four texture data elements (with all four of those texture data elements having (i.e. mapped to) that particular A position in the texture data array), each of the "B" positions in the texture data array will be occupied by four (different) texture data elements, (with all four of those texture data elements having (i.e. mapped to) that particular B position in the texture data array), and so on.

Thus, in this embodiment, each four adjacent (e.g. 16 bit) texture elements having a single position in the array are stored in a single (e.g. 64 bit wide) entry in the cache (that is designated to that position). Thus for example, four adjacent texture data elements (having a particular "A" position in the texture array) will be stored in a (single) cache entry designated to the "A" position, and four (different) adjacent texture elements (having a particular "B" position in the texture data array) will be stored in another (single) cache entry designated to the "B" position, and so on.

In embodiments wherein a plurality of texture data elements have (i.e. are mapped to) each position in the texture data elements (and a plurality of texture elements are stored in each cache entry), each texture data element can be considered to have a respective "sub-position" within their respective plurality of texture elements. For example, in the case wherein four texture elements have (i.e. are mapped to) a single (selectable) position in the texture data array, those four texture elements could be arranged in a 2×2 grid ("quad") of texture elements, with the texture data elements having respective sub-positions of the top left, top right, bottom left and bottom right of the quad.

In embodiment, rather than directly providing a texture data element from the texture data array in a single selection, the process of providing a texture data element is carried out in two stages: first, the plurality of adjacent texture data elements having a particular position (in a set of positions) are selected from the cache entry in which they are stored, and then a (single) texture data element having a particular sub-position in the plurality of texture data elements is selected from the plurality of adjacent texture data elements.

Thus, for example, in the case wherein four adjacent texture data elements have (i.e. are mapped to) each "A" position in the texture data array, first, four adjacent texture data elements having a particular "A" position in the texture data array are pulled out (i.e. selected) from the entry in the cache in which the four adjacent texture data elements are stored, and then one of the four adjacent texture data elements (having a particular sub-position in the four adjacent texture data elements) is pulled out (selected) from the selected four adjacent texture data elements.

Thus, according to an embodiment of the technology described herein, the step of providing a first input texture data element for a texture filtering operation from texture data elements having a first set of positions within the texture data array comprises first selecting a plurality of adjacent texture data elements all having a particular position in the first set of positions within the texture data array, and then selecting a single texture data element having a particular sub-position in the plurality of adjacent texture data elements from the plurality of texture data elements (and so on for any other required input texture data elements).

The step of selecting the plurality of texture data elements having a particular position in the set of positions in the texture data array can be carried out in any suitable or desired manner.

In an embodiment, this step is carried out using a multiplexer tree, e.g. as described above, that is connected to all of the texture cache entries designated to (and storing) the texture data elements having the particular set of positions in the texture data array. For example, a multiplexer tree could be connected to each of the designated "A" entries in the cache (each of which, as described above, store a plurality of (adjacent) texture data elements having an "A" position) and hence be used to select (pull out) a particular plurality of (e.g. four) texture data elements that are stored in a particular one of the cache entries to which the multiplexer tree is connected. Similarly, a (second) multiplexer tree could be connected to each of the designated "B" entries in the cache (each of which store a plurality of (adjacent) texture elements having a "B" position) and hence be used to select (pull out) a particular plurality of (e.g. four) texture data elements that are stored in a particular one of the cache entries to which the multiplexer tree is connected, and so on.

As will be understood, the multiplexer tree used to pull out a plurality of texture data elements from a cache entry (all having a particular position in the texture data array) should have a bit width that is sufficient to select all of the plurality of texture data elements stored in the cache entry. For example, in the case wherein each cache entry stores four adjacent texture elements, and each of the texture data elements have a bit depth of 16 bits, the multiplexer tree should have a bit width of at least 64 bits.

The step of selecting a texture data element having a particular sub-position in the plurality of adjacent texture data elements from the plurality of adjacent texture data elements can be carried out in any suitable or desired manner.

In an embodiment of the technology described herein, the step of selecting a texture data element having a particular sub-position within the plurality of adjacent texture data elements from the plurality of adjacent texture data elements comprises bit shifting a data string containing the plurality of adjacent texture data elements in order to select the texture data element having a particular sub-position within the plurality of adjacent texture data elements.

In an embodiment, the operation is so as to shift (move) the desired texture data element (value) (having the particular sub-position within the plurality of adjacent texture data elements), to a particular, in an embodiment selected, in an embodiment predetermined, position in the data string, such as, and in an embodiment, to the appropriate number of least significant bits in the data string (which are then used as the input texture data element value).

The bit shifting of the data string containing the plurality of texture elements (to select the texture data element having a particular sub-position in the plurality of texture data elements) can be carried out in any suitable or desired manner. For example, this could be done by bit shifting all of the bits in the data string containing the plurality of data elements, thereby returning a data string in which all the bits have been shifted.

However, the applicants have recognised that because only a particular (e.g. 16 bit) portion corresponding to a particular texture data element of the (e.g. 64 bit) data string (i.e. the portion corresponding to the desired texture data element having the particular sub-position within the plurality of data elements) is required to be provided for the texture processing operation in question, it is not necessary to use a circuit that can return all of the plural texture data elements contained in the data string (at once) for this purpose. Rather, a circuit which shifts the particular desired texture data element into a particular position in, such as the lowest significant (e.g. 16) bits of, the data string (without necessarily preserving the other texture data elements contained in the data string) is sufficient.

In other words, the applicants have recognised that it is possible to use a circuit which only shifts that required portion of the data string into the least significant bits of the data string (from where it is then read), without it mattering what is contained in the remaining (upper) bits of the data string. This means that the upper bits of the data string can be returned as they are (i.e. without modification), with the lower bits of the data string having been manipulated to return the desired texture data element. A regular bit shifting circuit, by contrast, would be required to either set the upper bits to zero (in the case of a "logic shift") or have the upper bits replicate the most significant bit (in the case of an "arithmetic" shift).

Because it is only necessary to shift a particular texture data element into the lowest significant bits of the data string in this manner, this can be done with smaller and/or less complex circuit(s) compared to the circuit(s) that would be required to shift (and/or preserve) every bit in the data string (for example) and/or to set the upper bits to specific values such as zero or to replicate the most significant bit.

Thus, in an embodiment of the technology described herein, the step of bit shifting the data string containing the plurality of adjacent texture data elements in order to select the texture data element having the particular sub-position within the plurality of adjacent texture data elements comprises shifting the texture data element having the particular sub-position into the lowest significant bits of the data string, in an embodiment without modifying an upper number of bits in the data string.

The applicants have further recognised that, because it is necessary to only shift an (entire) individual texture data element (as opposed to, e.g., individual bits of a texture data element) in order to select a particular texture data element having a particular sub position in this manner, the shifting process can be (and in an embodiment is) performed at a relatively "coarse" granularity that corresponds to the width of the texture data elements themselves (rather than at a finer granularity, e.g. 1 bit).

For example, in the case wherein each texture data element has a bit width of 8 bits, the process of shifting the (desired) texture data element (into the lowest significant bits of the data string) need only be performed at a granularity of 8 bits. A regular bit shifting circuit, by contrast, would be configured to shift a data string at a granularity of a single bit.

Because it is only necessary to shift a particular texture data element at a granularity that corresponds to the bit width of the texture data element in this manner, this can be done with smaller and/or less complex circuit(s) compared to typical shifter circuit(s) that would be required to shift data strings at the granularity of only a single bit.

Thus, in an embodiment of the technology described herein, the step of shifting the data string containing the plurality of adjacent texture data elements in order to select the texture data element having the particular sub-position within the plurality of adjacent texture data elements comprises shifting the data string at a granularity corresponding to the width of the texture data element having the particular sub-position.

The shifting of the desired texture data element (having the particular sub-position within the texture data array) into the lowest significant bits of the data string can be carried out in any suitable or desired manner, and with any suitable or desired circuit(s).

In an embodiment, this is performed using an asymmetrical multiplexer tree comprising a plurality of 2:1 multiplexers. An upper half of the data string is fed directly through to the overall output, and the upper and lower halves of the data string are fed through a first 2:1 multiplexer which selects either the upper half or the lower half of the original data string as an output smaller string. The upper half of the output smaller string is fed through to the overall output, and the upper and lower halves of the output smaller data string are fed through to a second 2:1 multiplexer, which selects either the upper half or the lower half of the smaller output data string as an output further smaller string, and so on. This process is continued to provide the desired texture data element in the lowest significant bits of the output. (Thus if there are 4 sub-positions within the initial data string, there will be three 2:1 multiplexer selecting (shifting) operations.)

Other arrangements would, of course, be possible.

The technology described herein may generally find application in any suitable tile-based rendering graphics processing system.

The technology described herein can be used for all forms of output that a graphics processor and graphics processing pipeline may be used to generate, such as frames for display, render to texture outputs, etc.

In some embodiments, the graphics processor and graphics processing system comprises, and/or is in communication with, one or more memories and/or memory devices that store the data described herein, and/or store software for performing the processes described herein. The graphics processor and graphics processing system may also be in communication with a host microprocessor, and/or with a display for displaying images based on the data generated by the graphics processor and graphics processing system.

In an embodiment, the various functions of the technology described herein are carried out on a single graphics processing platform that generates and outputs the rendered fragment data that is, e.g., written to a frame buffer for a display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements, stages, and pipelines of the technology described herein may comprise a suitable processor or processors, controller or controllers, functional units, circuits/circuitry, processing logic, microprocessor arrangements, etc., that are operable to perform the various functions, etc., such as appropriately configured dedicated hardware elements or processing circuits/circuitry, and/or programmable hardware elements or processing circuits/circuitry that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, if desired.

Thus the technology described herein extends to a graphics processor and to a graphics processing platform including the apparatus of or operated in accordance with any one or more of the embodiments of the technology described herein. Subject to any hardware necessary to carry out the specific functions discussed above, such a graphics processor can otherwise include any one or more or all of the usual functional units, etc., that graphics processors include.

It will also be appreciated by those skilled in the art that all of the described embodiments and embodiments of the technology described herein can, and in an embodiment do, include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processors, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, RAM, flash memory, CD ROM or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible medium, such as a non transitory computer readable medium, for example, diskette, CD ROM, ROM, RAM, flash memory or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

Figure 3:
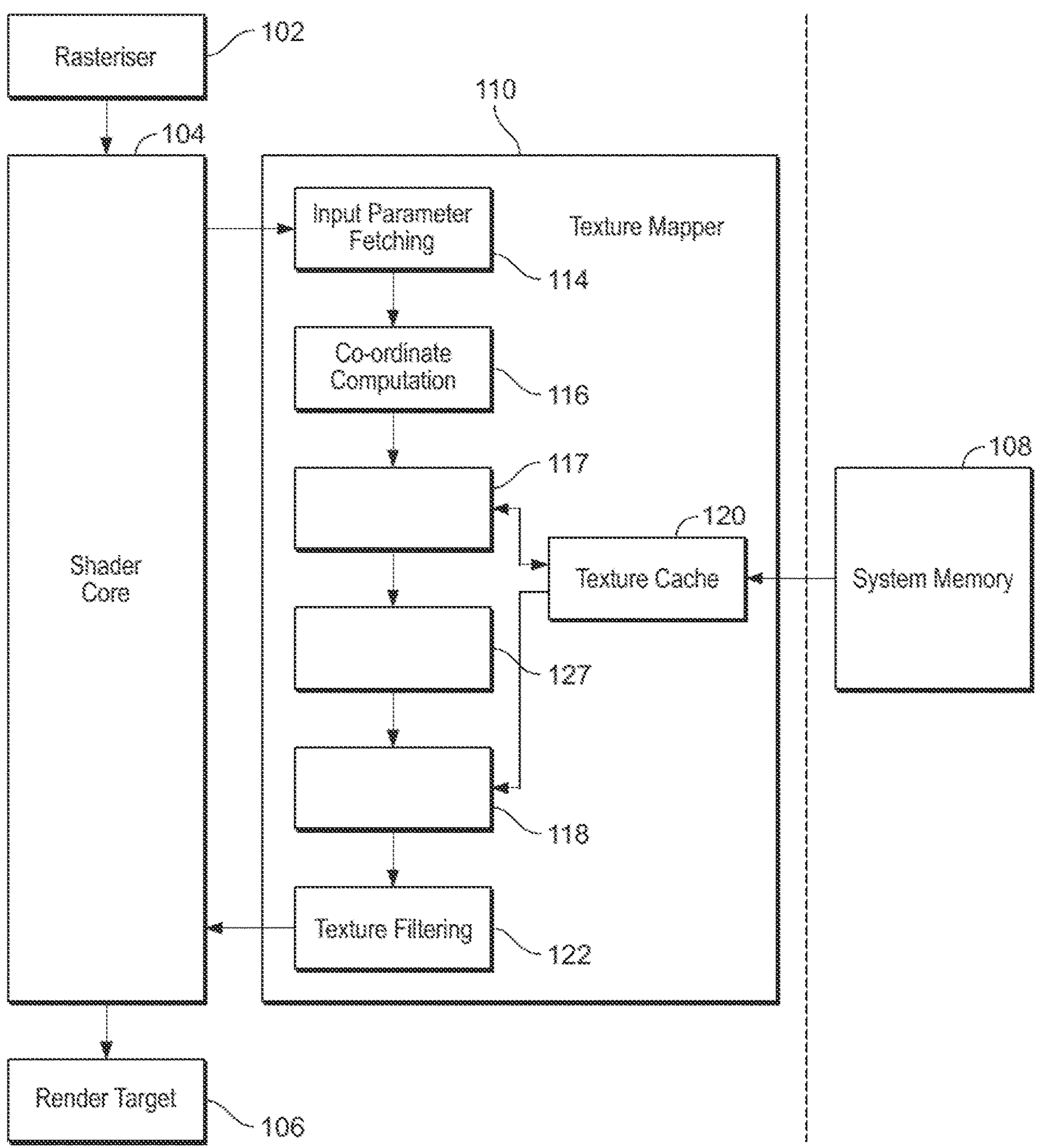
FIG. 3 shows a graphics processor in which the technology described herein and the present embodiments may be implemented.

FIG. 3 shows a graphics processor (graphics processing unit GPU) 100 that can perform texture processing operations according to a present embodiment of the technology described herein.

As shown in FIG. 3, the GPU 100 comprises data processing circuits that implement a graphics processing pipeline. The pipeline includes, inter alia, a rasterizer 102 and a renderer in the form of a programmable (fragment) shader core 104. The pipeline uses a buffer 106 (e.g. in external memory 108) for storing an output array (e.g. frame or image to be displayed). The memory 108 will also store, inter alia, graphics textures to be used by the GPU 100 when performing texture mapping operations.

The GPU 100 further comprises a texture mapper 110. The texture mapper 110 includes an input parameter fetching circuit 144, a coordinate computation circuit 116, a cache tester circuit 117, a texture cache 120, a texel selection circuit 118, and a texture filtering unit 122.

The arrows indicate the main ways in which data flows between various components of the GPU 100 and the memory 108. There may also be other communication routes or directions that are not indicated.

In this system, the rasterizer 102 will rasterize input primitives into individual graphics fragments for processing. To do this, the rasterizer 102 rasterizes the primitives to sampling positions representing the render output, and generates graphics fragments representing appropriate sampling positions for rendering the primitives. Each fragment may represent a single sampling position or a set of plural sampling positions. The fragments generated by the rasterizer 102 are then sent onwards to the fragment shader (renderer) 104 for shading.

The fragment shader 104 executes shader programs for the fragments issued by the rasterizer 102 in order to render (shade) the fragments. The fragments are processed using execution threads in the shader core, with the threads executing the shader program(s) that are to be used to process the fragments. A thread is executed for each sampling position that is to be shaded.

A shader program may include texturing instructions for texture mapping operations that are required to be executed by the texture mapper 110.

When a texturing instruction is encountered by the fragment shader 104, a texturing instruction is sent from the fragment shader 104 to the texture mapper 110, requesting the texture mapper 110 to perform texture processing. After the texture mapping apparatus 110 has finished its texture processing (carrying out the texturing instruction), the final result is sent back to the shader core 104 in a response message for use when shading the fragment in question.

The texture mapping apparatus 110 includes suitable processing circuits to follow texturing instructions. The processing circuits may be in the form of one or more dedicated hardware elements that are configured appropriately, or it may comprise programmable processing circuits that has been programmed appropriately. In this embodiment, a dedicated hardware texture mapping apparatus 110 is used.

The input parameter fetching circuit 114 of the texture mapper 110 receives the texturing instruction message from the shader core 104. The texturing instruction indicates the texture to be used (e.g. a texture field may be provided that includes a texture descriptor) and the sampling position coordinates at which to perform the texture operation.

The coordinate computation unit 116 then determines, from the sampling position coordinates, the texels (texture data elements) in the texture to be looked that should be read (i.e. selected) to perform the texture operation.

The cache tester unit 117 then checks whether the required texture data elements (texels) are already stored in the texture data cache 120. If the required data is not cached locally, a request is made to fetch the required data from memory 108 and load it into the texture cache 120.

The texture cache 120 comprises individually addressable cache entries that store an array of texture data elements (texels) locally to the texture mapping apparatus 110.

The texturing instruction is then parked into a parking buffer 127 to await further processing (e.g. pending the required data being fetched from the system memory 108 and loaded into the texture cache 120). Once the required texture data (texture data elements) have been loaded into the cache 120, data indicating the cache line and byte offsets where each of the texture data elements required to perform the texture operation are stored in the cache 120 are forwarded to the texture data element providing unit 118.

The texture data element providing unit 118 then provides (i.e. reads) texture data elements from the texture data cache that are required for the texture processing operation to be performed by the texture filtering unit 122. As will be discussed further below, the texture data providing unit comprises a plurality of multiplexer trees (MUX) which select texture data elements from texture data elements having particular sets of positions in the texture array stored in the texture data cache 120. In the present embodiment, the texture data providing circuit unit 118 provides four texture data elements in a 2×2 "quad" for a texture filtering operation for each of eight processing threads, i.e. 32 texture data elements altogether.

The operation of the texture data element providing unit 118 is discussed in further detail below.

The texture data elements selected from the texture cache by the texture data providing circuit 118 are then forwarded to the texture filtering unit 122. The texture filtering unit performs the bilinear filtering operation using the provided texture data elements (that make up a 2×2 "quad" of texture data elements), determining interpolation weights and computing an interpolated result from the texture data elements for the sampling position in question. The result is then output to (returned to) the shader core 104.

The "shaded" fragment from the shader core 104 is then stored as part of the output render target in the buffer 106, e.g. in the memory 108, e.g. for subsequent post-processing or display.

Other arrangements for the graphics processor and system would, of course, be possible.

Figure 4A:
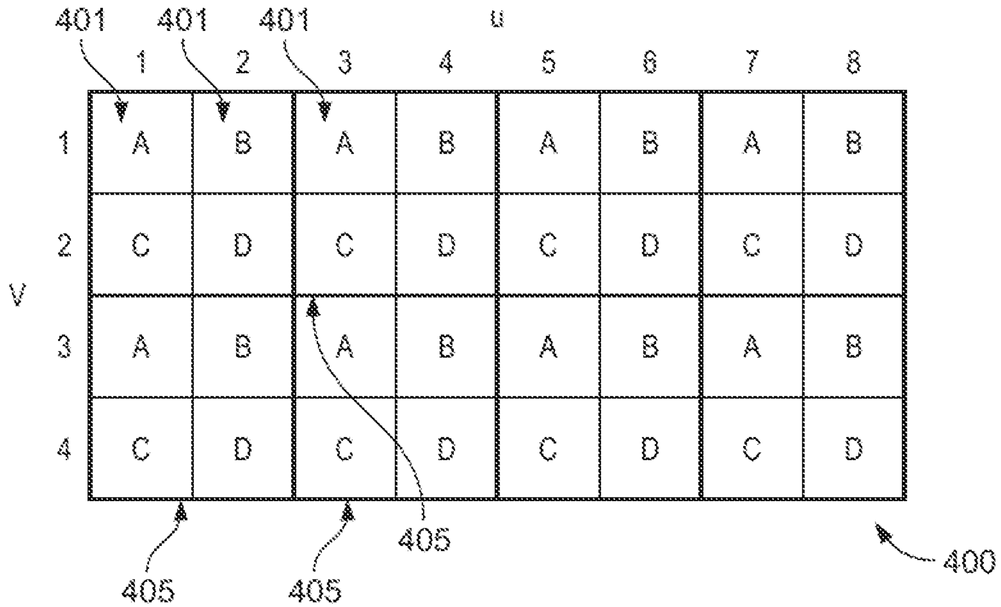
FIG. 4A shows a texture data array comprising texture data elements mapped to sets of positions according to an embodiment of the technology described herein.
Figure 4B:
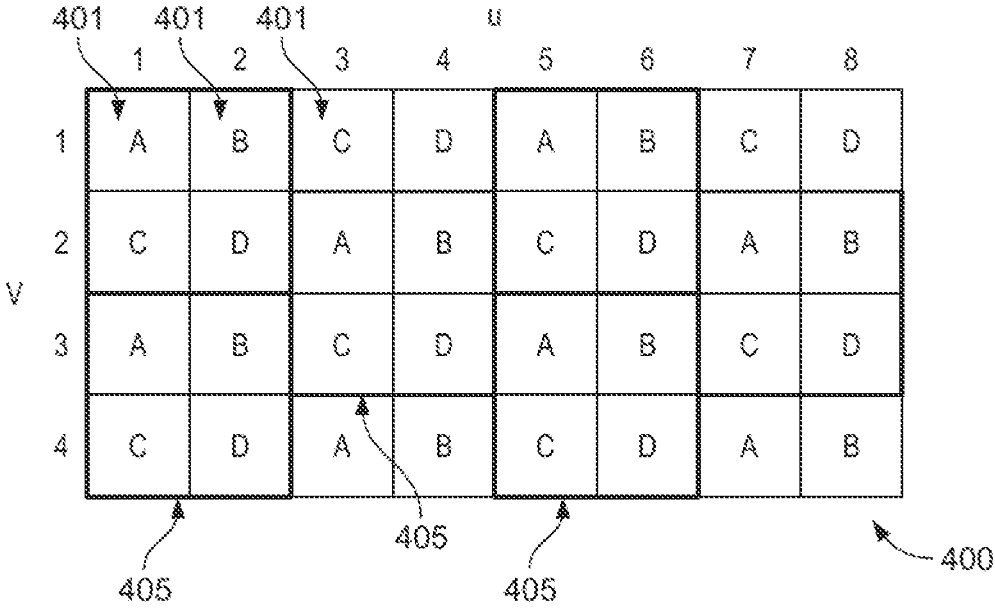
FIG. 4B shows a texture data array comprising texture data elements mapped to sets of positions according to another embodiment of the technology described herein.

FIGS. 4A and 4B show a texture data array 400 comprising texture data elements 401 that is stored in the texture data cache 120 at a particular time. The texture array is in the form of an 4×8 grid of texture data elements, i.e. comprising 32 texture data elements in total. Each of the texture data elements has a bit depth of 64 bpp and is stored in a respective texture cache entry having a bit width of 64 bits.

Each of the texture data elements is mapped to a particular set of positions ("A", "B", "C", or "D") and stored in a texture cache entry designated to the particular set of positions for the purposes of being selected by respective MUX trees in the texture providing circuit 118 in accordance with the technology described herein. As will be discussed further below, the mapping for a texture data element sets which MUX tree of the texture data element provision circuit 118 the texture data element is input to (through its respective read port for the texture data cache entry in which it is stored).

Thus, all of the texture data elements having the "A" position are stored in cache entries designated to the "A" position that are connected to (and thus may be selected by) a first multiplexer tree (MUX 0), all of the texture data elements having the "B" position are stored in cache entries designated to the "B" position that are connected to (and thus may be selected by) a second multiplexer tree (MUX 1), all of the texture data elements having the "C" position are stored in cache entries designated to the "C" position that are connected to (and thus may be selected by) a third multiplexer tree (MUX 2), and all of the texture data elements having the "D" position are stored in cache entries designated to the "D" position that are connected to (and may be read by) a fourth multiplexer tree (MUX 3).

As can be seen in the Figures, the texture data array can be considered to comprise a plurality of groups 405, each of the groups comprising a 2×2 "quad" of texture data elements mapped to different positions: a texture data element in the top left mapped to position "A", a texture data element in the top right mapped to position "B", a texture data element in the bottom left mapped to position "C", and a texture data element in the bottom right mapped to position "D".

FIGS. 4A and 4B relate to two different arrangements of these "quad" groups 405 according to two different embodiments of the technology described herein.

In the embodiment shown in FIG. 4A, the "quad" groups 405 are arranged adjacent to each other in a grid, such that the each row of the texture data array comprises texture elements ("A" and "B") from the top half of different quads only, or texture data elements ("C" and "D") from the bottom half of different quads only.

In the embodiment shown in FIG. 4B, the "quad" groups 405 are arranged in a staggered or offset arrangement with one another, i.e. such that rows of the texture data array are made up the top two data elements ("A" and "B") of quad groups alternated with the bottom two data elements ("C" and "D") of other quad groups.

Figure 5:
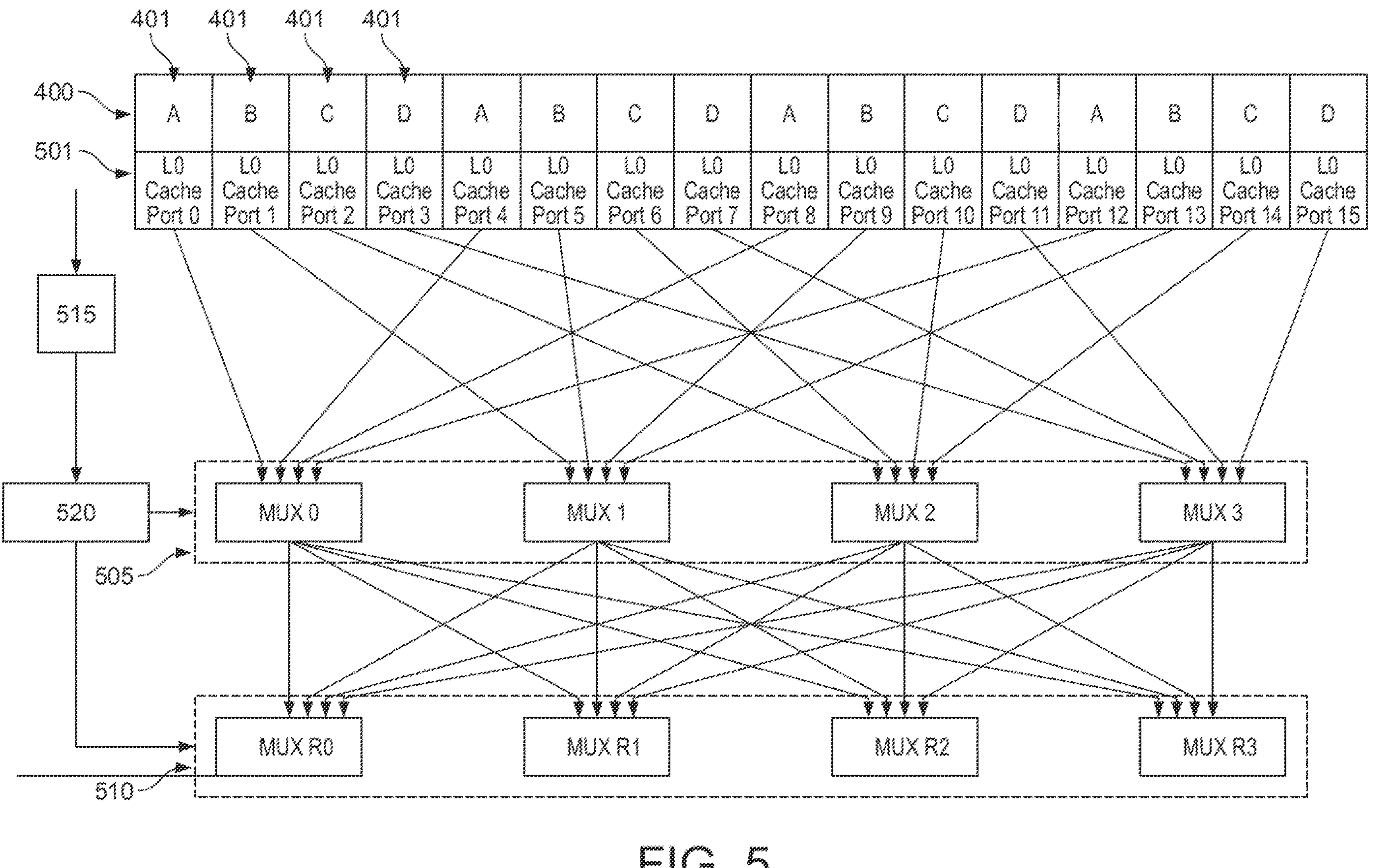
FIG. 5 shows schematically a process for providing texture data elements for input to a texture filtering operation according to an embodiment of the technology described herein.

FIG. 5 shows schematically a process for selecting texture data elements 401 from the texture data array 400 by the texture data providing unit 118 in an embodiment of the technology described herein. Each of the texture data elements 401 is associated with a respective read port 501 of the texture data cache entry in which it stored, through which the texture data element is read by a multiplexer tree. Only 16 of the 32 texture data elements in the texture data array 400 are shown (in a one dimensional line), for the purposes of clarity.

The texture data element selection unit 118 comprises multiplexer trees MUX 0, MUX 1, MUX 2 and MUX 3 (505). Although only a single set of four multiplexer trees are shown, in reality there would be a corresponding set of multiplexer trees (MUX 0, MUX 1, MUX 2 and MUX 3) for each of the eight processing threads. Thus there would be eight MUX 0 multiplexer trees, eight MUX 1 multiplexer trees, eight MUX 2 multiplexer trees and eight MUX 3 multiplexer trees.

As can be seen from the Figure, each of the multiplexer trees is connected to only the texture data elements having a particular set of positions within the texture data array. More specifically, MUX 0 is connected only to the texture data elements having the "A" position, MUX 1 is connected only to the texture data elements having the "B" position, MUX 3 is connected only to the texture data elements having the "C" position, and MUX 4 is connected only to the texture data elements having the "D" position. These connections are illustrated in the Figure by the arrows between the texture data elements 401 (through their respective read ports 501) and the MUX in question.

As will be understood, each of the MUX trees are connected to 8 data elements (through 8 respective read ports for the cache entries (lines) in which the texture data elements are stored) as inputs, and select a single texture data element (and are thus 8:1 MUX trees).

FIG. 5 also shows the texture data element metadata 515, received from the parking buffer 127, which indicates the positions of the particular texture data elements required for the texture filtering operation to be performed (i.e. the specific read port where they are stored, associated byte offset, etc). The data is fed to a calculation unit 520, which is used to provide control signals for the multiplexer trees 505 (MUX1, MUX2, MUX3 and MUX4) such that they select the correct (required) texture data elements, and for the second set of multiplexer trees 510 (MUX R0, MUX R1, MUX R2, MUX R3), such that they rearrange the texture data elements into the required order (discussed further below).

In the technology described herein, the multiplexer trees MUX 0, MUX 1, MUX 2 and MUX 3 may each select a texture data element of a 2×2 "quad" of data elements that are required for a bilinear filtering operation. For example, referring back to FIG. 4A, if a 2×2 quad of texture data elements having the (u, v) coordinates (4, 2), (5, 2), (4, 3) and (5, 3) are required for a bilinear filtering operation, then MUX 0 is used to select the (5, 3) texture data element (having position "A"), MUX 1 is used to select the (4, 3) texture data element (having position "B"), MUX 2 is used to select the (5, 2) texture data element (having position "C") and MUX 3 is used to select the (4, 2) texture data element (having position "D").

The outputs of each of the MUX trees MUX 0, MUX 1, MUX 2 and MUX 3 are provided as inputs to a second set of 4:1 MUX trees 510. Each of the second set of MUX trees 510 is a 4:1 multiplexer tree that is used to select a particular one of the outputs of the MUX 0, MUX1, MUX 2, MUX 3 multiplexer trees. The second set of MUX trees 510 is used to shuffle or rearrange the texture data elements selected by the first set of MUX trees, so they are provided in the order that is required for the texture filtering unit 122.

For example, in this embodiment, the texture filtering unit 122 expects to receive four texture data elements to perform a bilinear filtering operation in the order of: (i) the top left of the quad, followed by (ii) the top right of the quad, followed by (iii) the bottom left of the quad, followed by (iv) the bottom right of the quad. This required order of texture elements (that were selected by the first set of MUX trees) is provided by the outputs of the second set of MUX trees 510.

For example, the example discussed above, the texture data element in the top left of the quad (at (4, 2)) was selected by MUX 3, since it had a position "D" within the texture data array. The multiplexer MUX R0 is used to select this data element output by MUX 3, to bring it into the first position. The texture data element in the top right of the quad (at (5, 2)) was selected by MUX 2, since it had position "C". The multiplexer MUX R1 is used to select this data element output by MUX 3, to bring it into the second position. The texture data element in the bottom left of the quad (at (4, 3)) was selected by MUX 1, since it had position "B". The multiplexer MUX R2 is used to select this data element output by MUX 1, to bring it into the third position. The texture data element in the bottom right of the quad (at (5, 3)) was selected by MUX 0, since it had position "A". The multiplexer MUX R3 is used to select this data element output by MUX 0, to bring into the fourth position.

The four texture data elements (provided in the required order) are then provided to the filtering unit 122 so that the bilinear filtering operation can be performed.

Figures 6A, 6B:
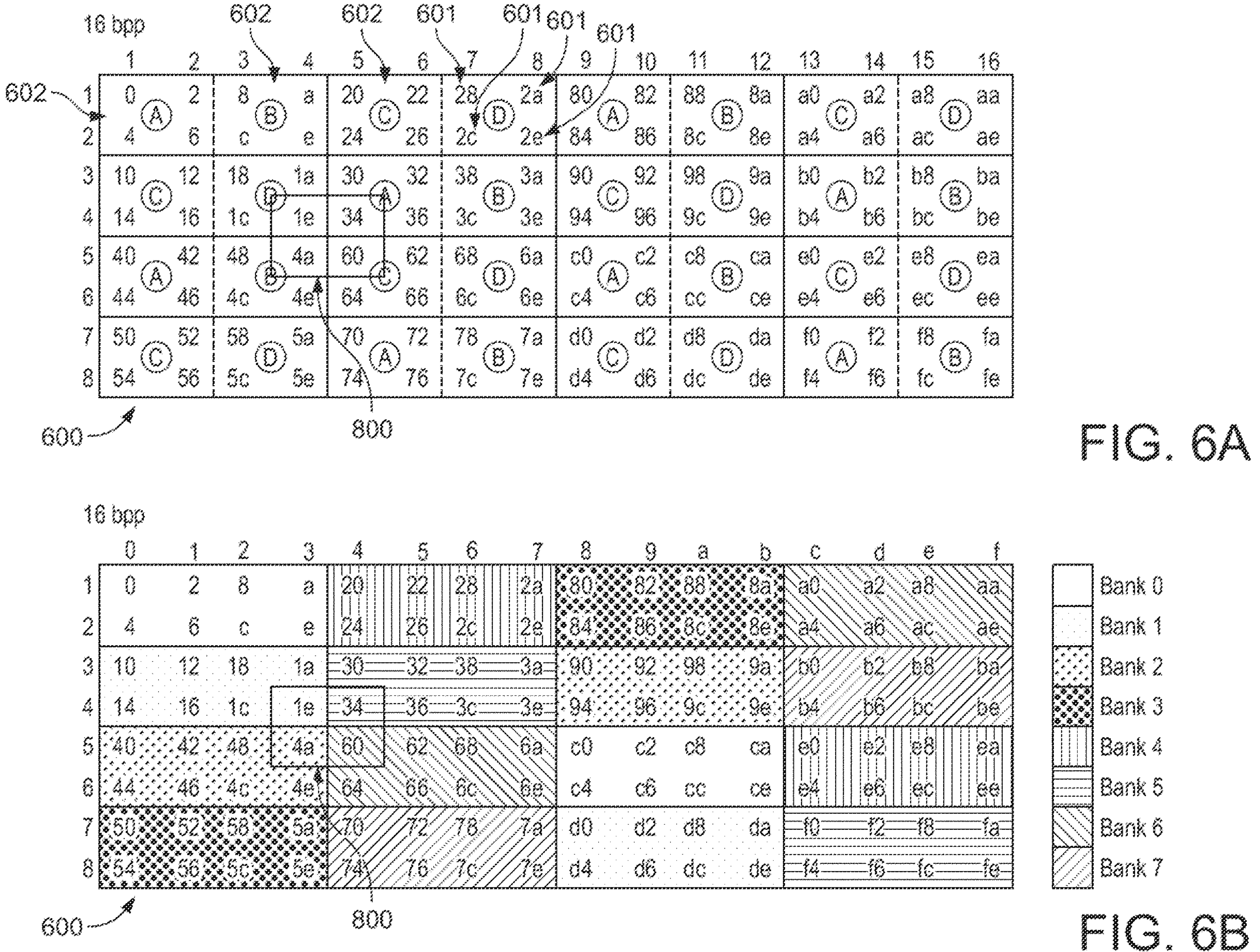
FIGS. 6A and 6B shows a texture data array wherein plural texture data elements are mapped to positions in another embodiment of the technology described herein.

FIGS. 6A and 6B show another texture data array 600 comprising texture data elements 601 that may be stored in the texture data cache 120. The texture array is in the form of a 16×8 grid of texture data elements, i.e. comprising 128 texture data elements in total. The byte offset of each texture data element within the cache (e.g. 0, 2, 4, 6, 8, a, c, e etc.) is shown.

In this texture data array, each of the texture data elements has a bit depth of 16 bpp. Each texture data cache entry has a bit depth of 64 bits, and hence each texture cache entry stores four adjacent texture data elements 602 (all having a particular position in the texture data array).

For example, the four texture data elements having byte offsets 0, 2, 4, 6 are all stored in a (single) texture cache entry designated to position "A", the four texture element data elements having byte offsets 40, 42, 44 and 46 are stored in another (single) texture cache entry designated to position "A", the four texture data elements having byte offsets 30, 32, 34, 36 are stored in yet another (single) texture cache entry designated to position "A", and so on. All of the cache entries designated to position "A" (each containing four texture data elements) are connected to (and thus may be selected by) the first multiplexer tree (MUX 0) of the texture data element providing unit 118.

Similarly, the four texture data elements having byte offsets 10, 12, 14, 16 are all stored in a (single) texture cache entry designated to position "B", the four texture element data elements having byte offsets 50, 52, 54 and 56 are stored in another (single) texture cache entry designated to position "B", the four texture data elements having byte offsets 20, 22, 24, 26 are stored in yet another (single) texture cache entry designated to position "B", and so on. All of the cache entries designated to position "B" (each containing four texture data elements) are connected to (and thus may be selected by) the second multiplexer tree (MUX 1) of the texture data element providing unit 118.

Similarly, other cache entries designated to position "C" and position "D" are connected to (and thus may be selected by) the third multiplexer tree (MUX 2) and fourth multiplexer tree (MUX 3) of the texture data element providing unit 118, respectively.

FIG. 6B shows the arrangement of the texture data elements 601 within the banks of the cache. Each line of the cache is made up of eight banks, with each bank containing two cache entries each designated to respective positions and connected to respective multiplexer trees (as discussed above).

Figure 7:
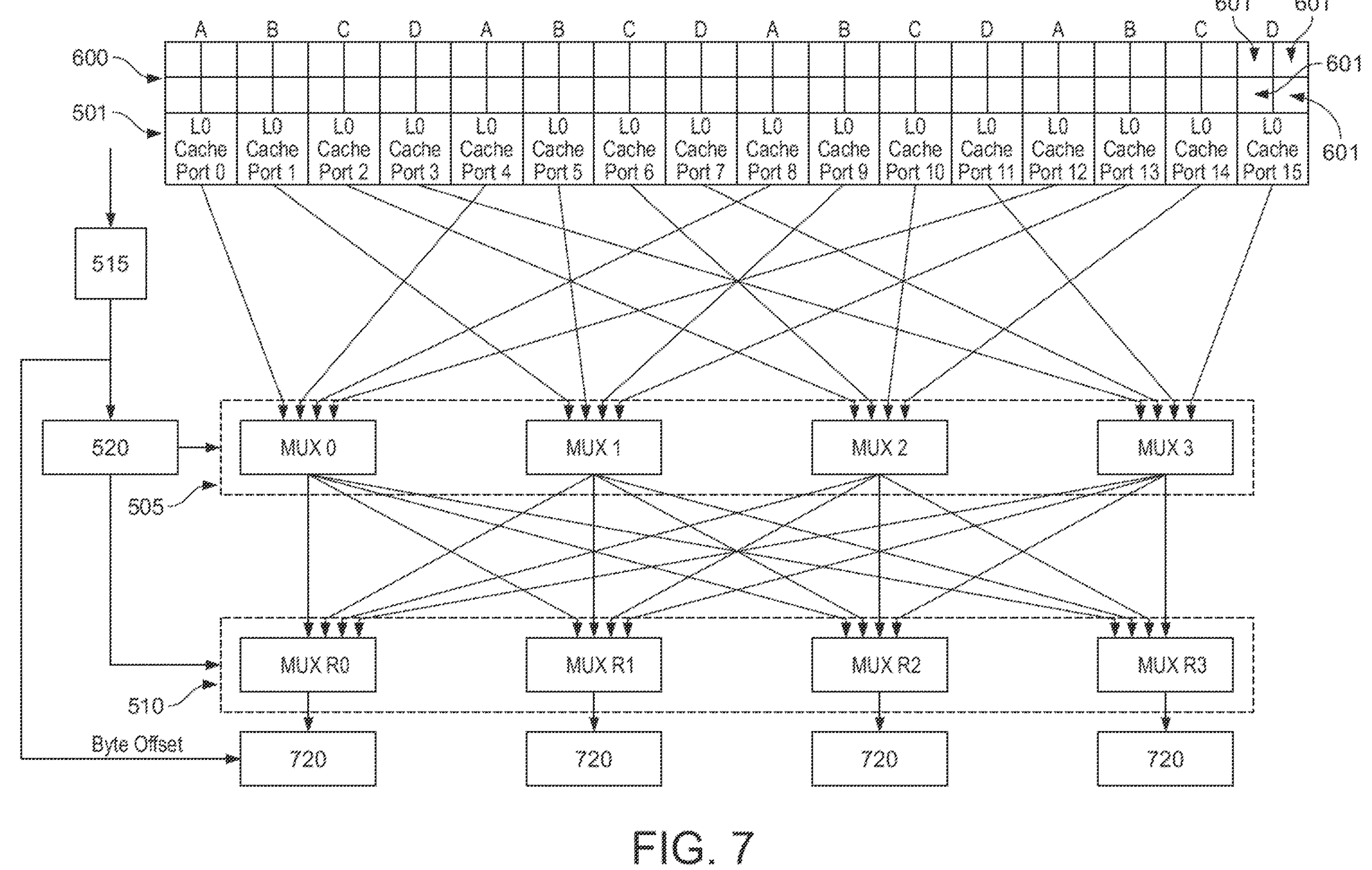
FIG. 7 shows schematically a process for providing texture data for input to a texture filtering operation according to the another embodiment of the technology described herein.

FIG. 7 shows schematically a process for selecting texture data elements 601 from the texture data array 600 by the texture data providing unit 118.

As can be seen from FIG. 7, each "quad" of four texture data elements 601 is associated with a respective read port 701 of the texture data cache entry in which they are stored, through which the "quad" of texture data elements in selected by a multiplexer tree. Only 16 of the 32 "quads" of texture data elements in the texture data array 600 are shown.

Similarly to FIG. 5, the texture data element selection unit 118 comprises multiplexer trees MUX 0, MUX 1, MUX 2 and MUX 3 (505). Although only a single set of four multiplexer trees are shown, in reality there would be a corresponding set of multiplexer trees (MUX 0, MUX 1, MUX 2 and MUX 3) for each of the eight processing threads. Thus there would be eight MUX 0 multiplexer trees, eight MUX 1 multiplexer trees, eight MUX 2 multiplexer trees and eight MUX 3 multiplexer trees.

As can be seen from the Figure, each of the multiplexer trees is connected to only the texture cache entries designated to a particular set of positions within the texture data array. More specifically, MUX 0 is connected only to texture cache entries designated to the "A" position, MUX 1 is connected only to the texture data entries designated to the "B" position, MUX 3 is connected only to the texture data cache entries designated to the "C" position, and MUX 4 is connected only to the texture data cache entries designated to the "D" position. These connections are illustrated in the Figure by the arrows between the texture data elements 601 (through their respective read ports 501 of the cache entries in which they are stored) and the MUX in question.

FIG. 7 also shows the texture data element metadata 515, received from the parking buffer 127, which indicates the positions of the particular texture data elements required for the texture filtering operation to be performed (i.e. the specific read port where they are stored, associated byte offset, etc). The data is fed to a MUX control signal calculation unit 520, which is used to calculate and provide control signals for the multiplexer trees 505 (MUX1, MUX2, MUX3 and MUX4) such that they select the correct (required) groups of texture data elements, and for the second set of multiplexer trees 510 (MUX R0, MUX R1, MUX R2, MUX R3), such that they rearrange the texture data elements into the required order (discussed further below). Byte offset information is fed to the texel shifters 720 in order to control the specific texture data element that is selected by each of the texel shifters (as discussed further below).

As will be understood, each of the MUX trees are connected to 8 64 bit texture cache entries (through their respective read ports) as inputs, and select a particular group of four texture data elements 602 that are stored in a particular single texture cache entry (thus each of the MUX trees are 8:1 MUX trees).

The outputs of each of the MUX trees MUX 0, MUX 1, MUX 2 and MUX 3 (i.e. the four texture data elements stored in each of four different cache entries to which the multiplexer trees are connected) are provided as inputs to a second set of 4:1 MUX trees 510, which are used to shuffle or rearrange the groups of four texture data elements selected by the first set of MUX trees, so they are provided in an order that is required for the texture filtering unit 122. Each data string containing these groups of four texture data elements is then fed through a respective texel shifter 720 (shown in FIG. 8) in order to shift a single texture data element into a set of lowest significant bits output by the texel shifter 720.

The four texture data elements output by each of the texel shifters 720 are then providing to the filtering unit 122 so that the bilinear filtering operation can be performed.

The process of selecting texture data elements, particularly with regard to the operation of the texel shifters 720, will be discussed in the following example wherein a particular four texture elements ("quad" 800 shown outlined in a black box in FIGS. 6A and 6B) are to be provided for a bilinear filtering operation.

As can be seen from FIGS. 6A and 6B, the four texture data elements of the "quad" of texture data elements which are required for the bilinear filtering operation have byte offsets of 1*e*, 34, 4*a* and 60 (respectively).

The texture data element in the top left of the quad (byte offset 1*e*) belongs to a group of four texture data elements stored in a texture cache entry for position "D" located in an upper half of bank 1, and hence this group of four texture data elements is selected through MUX 3. The texture data element in the top right of the quad (byte offset 34) belongs to a group of four texture data elements stored in a texture cache entry for position "A" located in the lower half of bank 5, and hence this group of four texture data elements is selected through MUX 0. The texture data element in the bottom left of the quad (byte offset 4*a*) belongs to a group of four texture data elements stored in a texture cache entry for position "B" located in the upper part of bank 2, and hence this group of four texture data elements is selected through MUX 1. The texture data element in the bottom right of the quad (byte offset 60) belongs to a group of four texture data elements stored in a texture cache entry for position "C" located in the lower half of bank 6, and hence this group of four texture data elements is selected through MUX 2.

Once the four groups of four texture elements (each of which contain a particular one of the texture elements required for the bilinear filtering operation) have been selected by the first set of multiplexer trees MUX 0, MUX 1, MUX 2 and MUX 3 in this manner, the four groups of texture data elements are provided in a particular order by the second set of MUX trees 710 (MUX R0, MUX R1, MUX R2 and MUX R3) that matches the order in which the texture filtering unit 122 expects to receive the texture data elements required for the bilinear filtering operation to be performed.

More particularly, the output of MUX 3 (which contains the texture data element having byte offset 1*e* in the top left of the quad that is required to be in the first position for the bilinear filtering operation) is selected by the first multiplexer MUX R0; the output of MUX 0 (which contains the texture data element having byte offset 34 that is required to be in the second position of the bilinear filtering operation) is selected by the second multiplexer MUX R1, and so on.

The re-ordered four groups of four texture data elements (each containing a particular one of the texture data elements required for the bilinear filtering operation to be performed) are then passed to respective texel shifters 720, which are used to select the particular texture data element (in each group of four) that is required for the bilinear filtering operation.

The colour values of various texture data elements according to the this example are shown in FIG. 9. As an example (and as shown in the Figure) a particular group of four texture elements 901 (having byte offsets 18, 1*a*, 1*c* and 1*e*) stored in a texture cache entry that were selected by MUX 3 (as discussed above) has a 64 bit data string value ("qword") of 0x913A8AA67E7B2397, which is provided as an input to a texel shifter 720.

The texel shifter 720 needs to select the texture data element having byte offset 1*e*, since this texture data element is required for the bilinear filtering operation to be performed. This texture data element is located in the upper bits and contains the colour value 0x913A. The shift amount required is simply the 3 lowest significant bits of the byte offset, which in this case is 0b110 (byte offset 0x1E=0b00011110).

Figure 8:
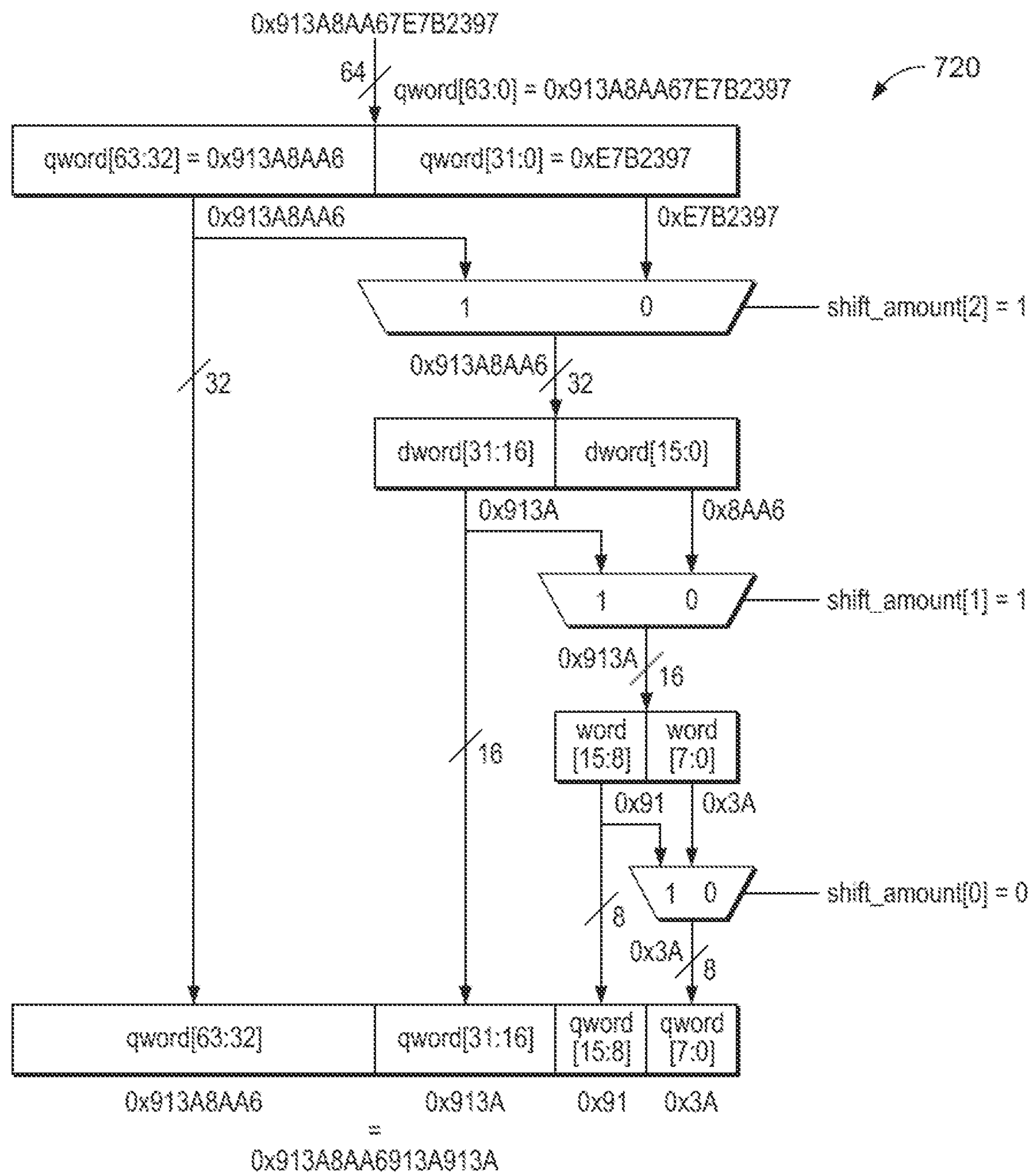
FIG. 8 shows schematically a texel shifter according to the another embodiment of the technology described herein.

FIG. 8 shows how the data goes through the texel shifter 720 in order to shift the required texture data element value into the lowest 16 bits of the data string (so that it can be provided to the filtering unit 122).

First, the upper half of the qword (0x913A8AA6) is fed-through directly to the upper half of the output, and both the upper half (0x913A8AA6) and lower half (0xE7B2397) are fed to the first 2-to-1 (32 bit) mux. Since the control input to the second mux is 1 (shift_amount[2]), it will pick the signal coming from the left (0x913A8AA6) and place it on its output. Once again, the high part (0x913A) of this mux's output is fed directly to the shifter's output.

The second 2-to-1 mux (16 bit) is again fed with the upper (0x913A) and lower (0x8AA6) parts of the 32-bit dword given by the first mux, and once again, since the control signal of this mux is set to 1, it will pick the left signal (0x913A) and place it on its output. The upper part of this output is fed directly to the shifter's output. The third 2-to-1 mux is set to 0, so it will pick the signal coming from the right (0x3A) and place it on its output, which is sent directly to the shifter's output as the least significant byte.

By concatenating these outputs, we will have the following output at the output of the shifter: 0x913A8AA6913A913A. Because the required texture element is only 16 bpp, only the lowest 16 bits needs to be forwarded to the texture filtering unit, and the others can be discarded. As can be seen, the lower 16 bits of this data are indeed 0x913A, which is the colour value for the texture data element that is required for the bilinear filtering operation that is to be performed.

It should be noted that FIG. 5 shows a process for selecting 64 bit wide texture data elements using the texture data element selection circuit 118 and FIG. 7 shows a process for selecting 16 bit wide texture data elements using the same texture data element selection circuit 118. In other words, the same hardware is used for performing both processes. (In this regard, it should be noted that the smart shifters 720, although not shown in the process of FIG. 5, could and would be present, but would not be to perform any shifting in this case (since the step of selecting texture data elements at particular sub-positions is not required).)

In the specific embodiment(s) described above, texture data elements (or groups thereof) are directly selected from a texture data array stored in the texture data cache by a set of MUX trees. However, it would instead be possible to first select a smaller array of texture data elements (or groups thereof) from the texture data array stored in the cache using a preliminary set of MUX trees, with individual texture data elements (or groups thereof) then being selected from the smaller, selected texture data array.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A method of operating a graphics processor in which texture data elements are selected for performing texture processing operations, the texture data elements being arranged in an array of texture data elements, the texture data elements of the array of texture data elements having a respective position in the array of texture data elements, wherein each of the texture data elements of the array of texture data elements belongs to one of M sets of texture data elements, each of the M sets of texture data elements having a respective set of positions in the array of texture data elements, wherein M is a positive integer, the method comprising: providing M texture data elements as inputs for a texture processing operation from the array of texture data elements, each of the M texture data elements being selected from the texture data elements of a respective different set of texture data elements of the M sets of texture data elements by a respective multiplexer tree, each multiplexer tree taking as its inputs only texture data elements belonging to its respective set of texture data elements and no texture data elements from any other set; and performing the texture processing operation using the M texture data elements.

2. The method of claim 1, wherein M=4 and the step of performing the texture processing operation comprises performing a bilinear filtering operation using the M texture data elements.

3. The method of claim 1, comprising providing M texture data elements as inputs for a texture processing operation for each of T threads in parallel, wherein T is a positive integer, to thereby provide M*T texture data elements for T different texture processing operations; and performing the T different texture processing operations using the M*T texture data elements;

wherein the texture data elements of each different set of texture data elements having a different set of positions within the array of texture data elements are connected to N read ports in a texture data cache, wherein N is a positive integer, and the method thereby comprises selecting M*T texture data elements from M*N read ports in the texture data cache.

4. The method of claim 1, wherein the array of texture data elements comprises a regular arrangement of groups of M texture data elements, each group of M texture data elements having one texture data element from each respective one of the M sets of positions in the array of texture data elements optionally wherein each group of texture data elements comprises a 2×2 quad of texture data elements.

5. The method of claim 1, further comprising prior to performing the texture processing operation using the M texture data elements, reordering the M texture data elements.

6. The method claim 1, wherein the step of performing the texture processing operation comprises multiplying the M texture data elements with respective weights, and the method further comprises:

prior to performing the texture processing operation using the M texture data elements, reordering the weights based on the order of the M selected texture data elements.

7. The method of claim 1, wherein the step of providing M texture data elements as inputs for a texture processing operation from the array of texture data elements comprises:

first selecting a plurality of adjacent texture data elements all having a particular position in the first set of positions within the texture data array; and then selecting a texture data element having a particular sub-position within the plurality of adjacent texture data elements from the plurality of adjacent texture data elements.

8. The method of claim 7, wherein the step of selecting a texture data element having a particular sub-position within the plurality of adjacent texture data elements from the plurality of adjacent texture data elements comprises bit shifting a data string containing the plurality of adjacent texture data elements in order to select the texture data element having a particular sub-position within the plurality of adjacent texture data elements.

9. The method of claim 8, wherein the step of bit shifting the data string containing the plurality of adjacent texture data elements in order to select the texture data element having the particular sub-position within the plurality of adjacent texture data elements comprises shifting the texture data element having the particular sub-position into the lowest significant bits of the data string without modifying an upper number of bits in the data string.

10. The method of claim 1, wherein a texture data element is provided as an input for the texture processing operation from texture data elements having a set of positions within the texture data array in a first processing cycle, and the method further comprises:

prior to performing the texture processing operation, providing another texture data element as an input for the texture processing operation from the texture data elements having the set of positions within the texture data array in a second processing cycle; and performing the texture processing operation using the two texture data elements provided in the first and second processing cycles from the texture data elements having the set of positions within the texture data array.

11. A graphics processor operable to perform texture processing operations, the texture data elements being arranged in an array of texture data elements, each texture data element of the array of texture data elements having a respective position in the array of texture data elements, wherein each of the texture data elements of the array of texture data elements belongs to one of M sets of texture data elements, each of the M sets of texture data elements having a respective set of positions in the array of texture data elements, wherein M is a positive integer, the graphics processor comprising: a texture data element providing circuit operable provide M texture data elements as inputs for a texture processing operation from the array of texture data elements, each of the M texture data elements being selected from the texture data elements of a respective different set of texture data elements of the M sets of texture data elements by a respective multiplexer tree, each multiplexer tree taking as its inputs only the respective texture data elements belonging to its respective set of texture data elements and no texture data elements from any other set; and a texture processing circuit operable to perform a texture processing operation using the M texture data elements.

12. The graphics processor of claim 11, wherein M=4 and the texture processing operation that the texture processing circuit is operable to perform is a bilinear filtering operation.

13. The graphics processor claim 11, wherein the texture data element providing circuit is configured to provide M texture data elements as inputs for a texture processing operation for each of T threads in parallel, wherein T is a positive integer to thereby provide M*T texture data elements for T different texture processing operations; and The texture processing circuit is operable to perform T different texture processing operations using the M*T texture data elements;

wherein the texture data elements of each different set of texture data elements having a different set of positions within the array of texture data elements are connected to N read ports in a texture data cache, wherein N is a positive integer, and the texture data element providing circuit it operable to provide M*T texture data elements from M*N read ports in the texture data cache.

14. The graphics processor of claim 11, wherein the array of texture data elements comprises a regular arrangement of groups of M texture data elements, each group of M texture data elements having one texture data element from each respective one of the M sets of positions in the array of texture data elements, optionally wherein each group of texture data elements comprises a 2×2 quad of texture data elements.

15. The graphics processor of claim 11, wherein the texture data element providing circuit is operable to reorder the M texture data elements.

16. The graphics processor of claim 11, wherein the texture processing circuit is operable to perform a texture processing operation comprising multiplying the M texture data elements with respective weights, and the texture data element providing circuit is operable to reorder the weights based on the order of the M selected texture data elements.

17. The graphics processor of claim 11, wherein the texture data element providing circuit is operable to select a texture data element for a texture filtering operation from texture data elements having a set of positions within the texture data array by:

first selecting a plurality of adjacent texture data elements all having a particular position in the first set of positions within the texture data array; and then selecting a texture data element having a particular sub-position within the plurality of adjacent texture data elements from the plurality of adjacent texture data elements.

18. The graphics processor of claim 17, wherein the texture data element providing circuit is operable to select a texture data element having a particular sub-position within the plurality of adjacent texture data elements from the plurality of adjacent texture data elements by bit shifting a data string containing the plurality of adjacent texture data elements in order to select the texture data element having a particular sub-position within the plurality of adjacent texture data elements.

19. The graphics processor of claim 18, wherein the texture data element providing circuit is operable to bit shift the data string containing the plurality of adjacent texture data elements in order to select the texture data element having the particular sub-position within the plurality of adjacent texture data elements by shifting the texture data element having the particular sub-position into the lowest significant bits of the data string without modifying an upper number of bits in the data string.

20. A non-transitory computer readable storage medium storing computer software code which, when executing on at least processor, performs a method of operating a graphics processor in which texture data elements are selected for performing texture processing operations, the texture data elements being arranged in an array of texture data elements, the texture data elements of the array of texture data elements having a respective position in the array of texture data elements, wherein each of the texture data elements of the array of texture data elements belongs to one of M sets of texture data elements, each of the M sets of texture data elements having a respective set of positions in the array of texture data elements, wherein M is a positive integer, the method comprising: providing M texture data elements as inputs for a texture processing operation from the array of texture data elements, each of the M texture data elements being selected from the texture data elements of a different set of texture data elements of the M sets of texture data elements by a respective multiplexer tree, each multiplexer tree taking as its inputs only the texture data elements belonging to its respective set of texture data elements and no texture data elements from any other set; and performing the texture processing operation using the M texture data elements.

* * * * *